(12) United States Patent  (10) Patent No.: US 8,926,014 B2
Su  (45) Date of Patent: Jan. 6, 2015

(54) ADJUSTABLE ANCHORAGE MECHANISM AND CHILD SAFETY SEAT THEREWITH

(75) Inventor: Yu-Ya Su, Central (HK)

(73) Assignee: Wonderland Nurserygoods Company Limited, Kwai Chung, N.T. (HK)

( * ) Notice: Subject to any disclaimer, the term of this patent is extended or adjusted under 35 U.S.C. 154(b) by 186 days.

(21) Appl. No.: 13/607,825

(22) Filed: Sep. 10, 2012

(65) Prior Publication Data

US 2013/0099535 A1  Apr. 25, 2013

Related U.S. Application Data

(60) Provisional application No. 61/549,249, filed on Oct. 20, 2011.

(30) Foreign Application Priority Data

Mar. 6, 2012 (CN) .......................... 2012 1 0056763

(51) Int. Cl.
*A47C 1/08* (2006.01)
*B60N 2/28* (2006.01)

(52) U.S. Cl.
CPC .............. B60N 2/286 (2013.01); B60N 2/2863 (2013.01); B60N 2/2887 (2013.01)
USPC ..................... 297/250.1; 297/253; 297/256.14

(58) Field of Classification Search
CPC .. B60N 2/2821; B60N 2/2887; B60N 2/2863; B60N 2/286; B60N 2/2893
USPC .................. 297/250.1, 253, 256.14
See application file for complete search history.

(56) References Cited

U.S. PATENT DOCUMENTS

| 5,524,965 | A | * | 6/1996 | Barley ...................... 297/256.16 |
| 5,971,479 | A | * | 10/1999 | Jacquemot et al. ...... 297/256.14 |
| 6,082,819 | A | * | 7/2000 | Jackson ........................ 297/253 |
| 8,226,162 | B2 | * | 7/2012 | Campbell et al. ......... 297/216.11 |
| 2002/0038968 | A1 | | 4/2002 | Maier |
| 2007/0284924 | A1 | * | 12/2007 | Gold et al. ..................... 297/253 |
| 2009/0261640 | A1 | * | 10/2009 | Christ et al. .................. 297/253 |

FOREIGN PATENT DOCUMENTS

| DE | 196 46 621 C1 | 11/1997 |
| EP | 0 619 202 A1 | 10/1994 |
| EP | 0 692 401 A1 | 1/1996 |
| WO | 2006123169 A1 | 11/2006 |
| WO | 2011083118 A1 | 7/2011 |

* cited by examiner

*Primary Examiner* — Laurie Cranmer
(74) *Attorney, Agent, or Firm* — Winston Hsu; Scott Margo

(57) ABSTRACT

An adjustable anchorage mechanism and a child safety seat are disclosed. The adjustable anchorage mechanism includes a seat base and a connecting device pivotally connected to the seat base. A seat is joined onto the top of the seat base. The connecting device is pivotally connected to the seat base relative to the seat such that the connecting device is capable of rotating downward so as to be engaged with an anchor-holding structure of a car seat selectively in front or rear of the seat. Therefore, the invention can provide child forward-facing or backward-facing sitting directly, which avoids the inconvenience of caregivers being demanded to prepare two child safety seats for different use conditions.

7 Claims, 11 Drawing Sheets

US 8,926,014 B2

ADJUSTABLE ANCHORAGE MECHANISM AND CHILD SAFETY SEAT THEREWITH

CROSS REFERENCE TO RELATED APPLICATIONS

This application claims the benefit of U.S. Provisional Application No. 61/549,249 and China Patent Application No. 201210056763.9, which were filed on Oct. 20, 2011 and Mar. 6, 2012 respectively and are incorporated herein by reference.

BACKGROUND OF THE INVENTION

1. Field of the Invention

The invention relates to a child safety seat, and especially relates to an adjustable anchorage mechanism used in a child safety seat and a child safety seat therewith.

2. Description of the Prior Art

In general, if a child sits in a car, a child safety seat is installed in the car for the safety of the child during the journey. Childs in infant period (i.e. from new-born to 1 year old) need a child safety seat in rearward-facing configuration; children after the period need a child safety seat in forward-facing configuration. In Europe, child safety seats have to be capable of using a fixture of ISOFIX (i.e. a device in conformity with the specification of anchorage structure of car seat by International Organization for Standardization), so the design for the child safety seat capable of being used in forward-facing configuration and in rearward-facing configuration faces the challenge to make the child safety seat available for ISOFIX both in forward-facing configuration and in rearward-facing configuration. In the present market, child safety seats capable of being engaged both in forward-facing configuration and in rearward-facing configuration are available, so it is unnecessary for parents to buy two different kinds of child safety seats so as to save money. However, the design of such child safety seat is seldom simple and efficient.

SUMMARY OF THE INVENTION

An objective of the invention is to provide an adjustable anchorage mechanism used in a child safety seat and a child safety seat having the adjustable anchorage mechanism. The adjustable anchorage mechanism utilizes a rotatable connecting device to be engaged with an anchor-holding structure of a car seat incoordination with the child safety seat in forward-facing configuration or in rearward-facing configuration, so as to provide child forward-facing or rearward-facing sitting accordingly.

The adjustable anchorage mechanism of the invention is used in a child safety seat. The adjustable anchorage mechanism includes a seat base and a connecting device. The seat base thereon defines a seat direction and a sitting direction. The seat base is joined with a seat such that the seat faces toward the seat direction. That is, when a child is seated in the seat, the child faces toward the seat direction. The child is seated in the seat in the sitting direction. In general, the sitting direction is from top to bottom. The connecting device is pivotally connected to the seat base and is capable of being engaged with an anchor-holding structure of a car seat. The connecting device includes a connection part and an engagement part. The connection part is pivotally connected to the seat base in a pivotal direction. The pivotal direction is perpendicular to the seat direction and the sitting direction. The engagement part is connected to the connection part and is used for being engaged with the anchor-holding structure. Therefore, the adjustable anchorage mechanism utilizes the rotatable connecting device to provide two engagement directions with the anchor-holding structure, so that the invention can realize the design of forward-facing and rearward-facing safety seat in a single product. Furthermore, the connecting device is rotatable downward relative to the seat base, so in principle, changing the engagement direction of the adjustable anchorage mechanism with the anchor-holding structure needs only vertical operation space, which facilitates user's operation.

The child safety seat of the invention includes a seat base, a seat, and a connecting device. The seat base thereon defines a seat direction and a sitting direction. The seat is joined with the seat base such that the seat faces toward the seat direction. That is, when a child is seated in the seat, the child faces toward the seat direction. The child is seated in the seat in the sitting direction. In general, the sitting direction is from top to bottom. The connecting device is pivotally connected to the seat base and is capable of being engaged with an anchor-holding structure of a carseat. The connecting device includes a connection part and an engagement part. The engagement part is connected to the connection part. The connection part is pivotally connected to the seat base in a pivotal direction. The pivotal direction is perpendicular to the seat direction and the sitting direction, so that the engagement part is capable of being engaged with the anchor-holding structure selectively in front or rear of the seat. Therefore, the child safety seat includes the adjustable anchorage mechanism so as to be capable of being engaged with the anchor-holding structure in different directions selectively, which realizes the design of a forward-facing and rearward-facing safety seat. Similarly, in principle, the direction-changing operation of the engagement direction of the child safety seat needs only vertical operation space, which facilitates user's operation.

Based on the above, compared with the prior art, the invention realizes the design of forward-facing and rearward-facing safety seat in a single product structure, so it is unnecessary for users to buy two kinds of different safety seats, so as to save money. Furthermore, in principle, the direction-changing operation of the safety seat needs only vertical operation space, so objects adjacent to the safety seat need no movement during the direction-changing operation. It is conducive to user's operation.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
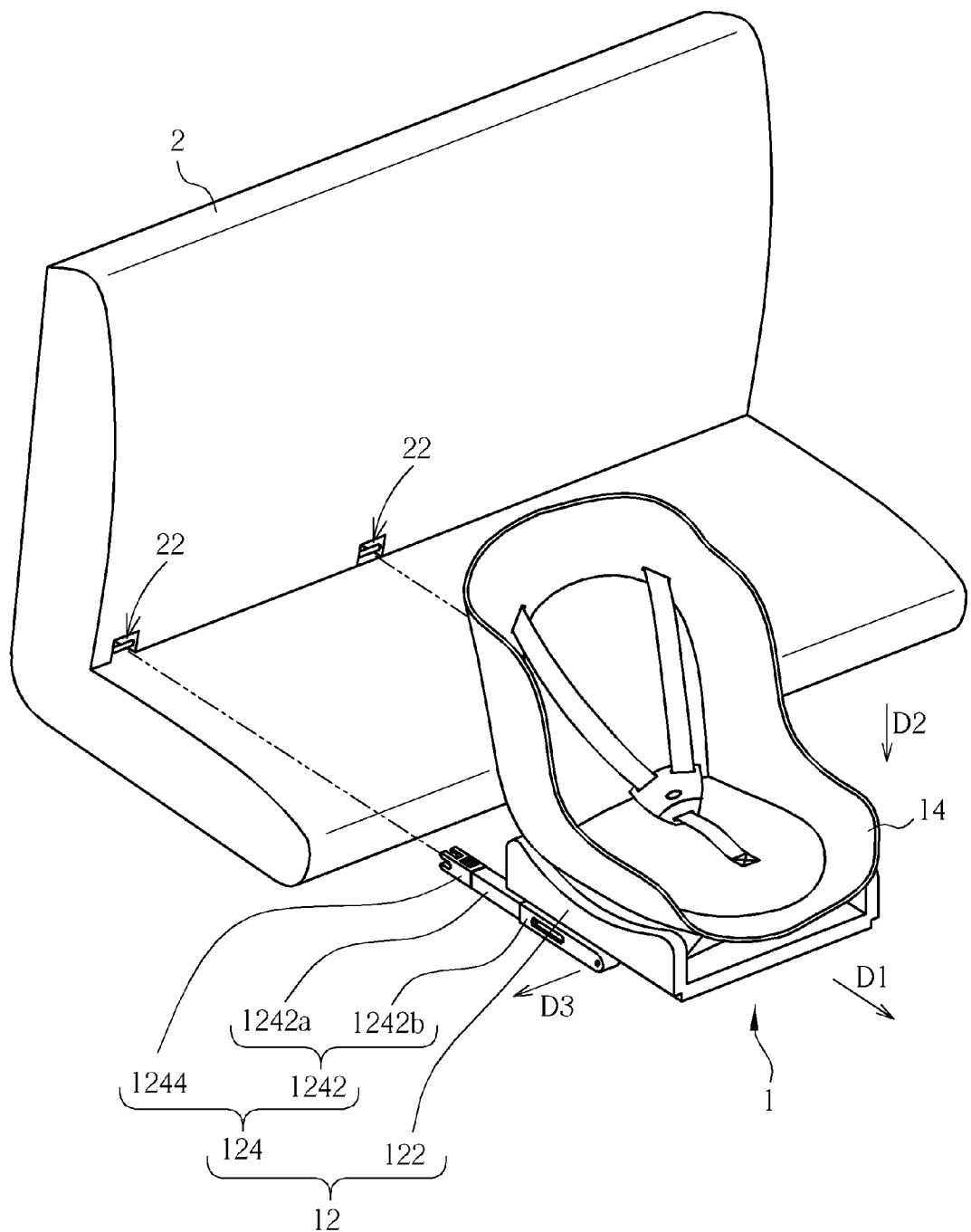
FIG. 1 is a schematic diagram illustrating an engagement of a child safety seat with a car seat of a preferred embodiment according to the invention.
Figure 2:
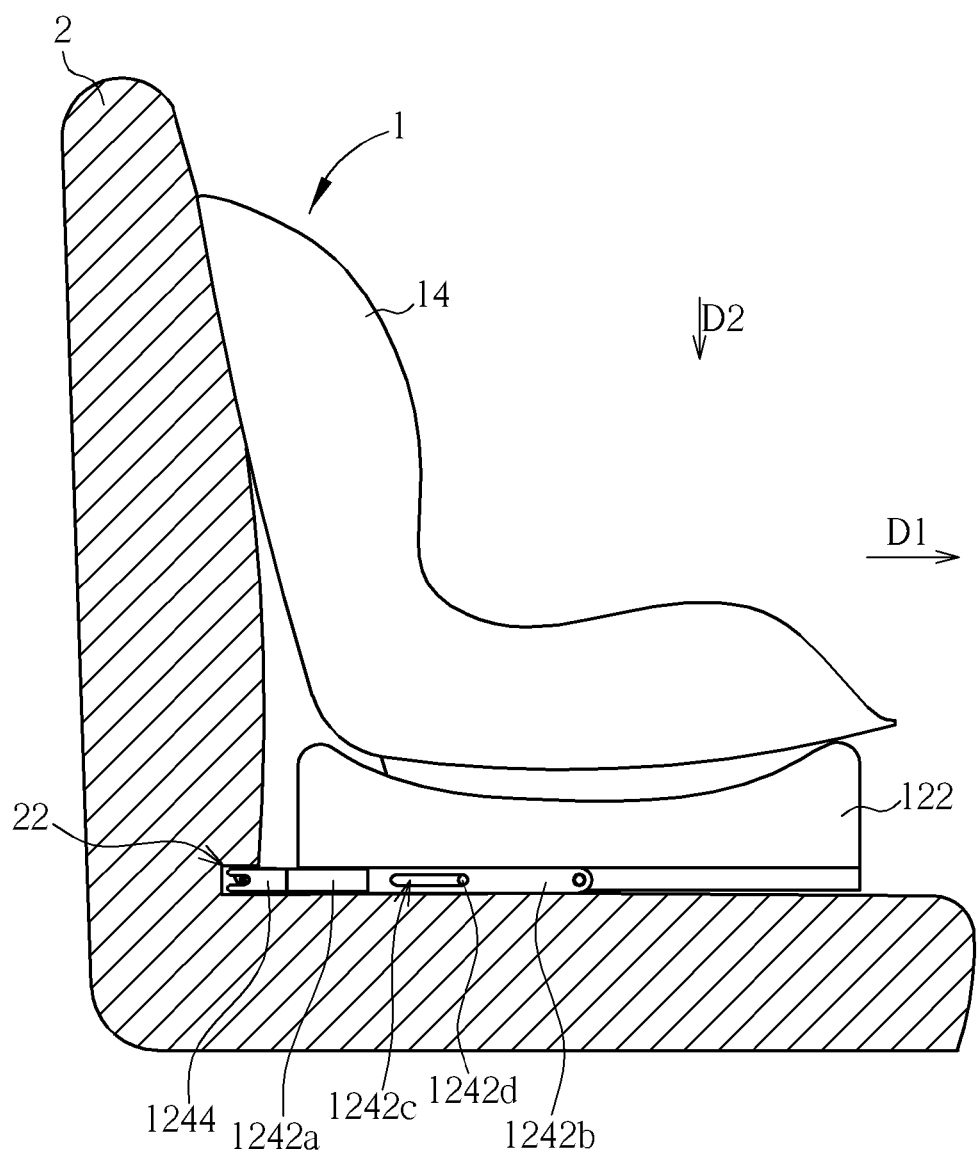
FIG. 2 is a side view of the child safety seat and the car seat in FIG. 1.

Please refer to FIG. 1 and FIG. 2. FIG. 1 is a schematic diagram illustrating an engagement of a child safety seat 1 with a car seat 2 of a preferred embodiment according to the invention. FIG. 2 is a side view of the child safety seat 1 and the car seat 2; therein, the car seat 2 is cross sectioned for illustrating an anchor-holding structure 22 of the car seat 2. The child safety seat 1 includes an adjustable anchorage mechanism 12 and a seat 14. The adjustable anchorage mechanism 12 is engaged with the anchor-holding structure 22. In the embodiment, the anchor-holding structure 22 in conformity with the ISOFIX specification includes two anchorage points. However, in practice, the type and disposition of the anchor-holding structure of the invention is not limited thereto.

The adjustable anchorage mechanism 12 includes a seat base 122 and a connecting device 124. The seat base 122 thereon defines a seat direction D1 and a sitting direction D2. The seat base 122 is joined with the seat 14 such that the seat 14 faces toward the seat direction D1. A child is capable of sitting on the seat 14 in the sitting direction D2, i.e. from top to bottom. The child faces toward the seat direction D1. The connecting device 124 is pivotally connected to the seat base 122 and is capable of being engaged with the anchor-holding structure 22 of the car seat 2. In the embodiment, the connecting device 124 is pivotally connected to opposite sides of the seat base 122, but the invention is not limited thereto. In practice, the connecting device 124 can be disposed on the bottom of the seat base 122, such as a recess can be formed on the bottom of the seat base 122. The connecting device 124 includes a connection part 1242 and an engagement part 1244 connected to the connection part 1242. The connection part 1242 is pivotally connected to the seat base 122 in a pivotal direction D3. The pivotal direction D3 is perpendicular to the seat direction D1 and the sitting direction D2. The engagement part 1244 is used for being engaged with the anchor-holding structure 22. In the disposition shown by FIG. 1 and FIG. 2, the engagement part 1244 is engaged with the anchor-holding structure 22 in rear of the seat 14. The child safety seat 1 is therefore used in a forward-facing configuration. In use, the connecting device 124 also can be rotated to the front of the seat 14 relative to the seat base 122 to be engaged with the anchor-holding structure 22 again, so as to form a safety seat in a rearward-facing configuration. The changing operation will be described in the following.

Further, the connection part 1242 includes a movable part 1242a and a pivotal part 1242b. The connection part 1242 is pivotally connected to the seat base 122 by the pivotal part 1242b. The movable part 1242a and the pivotal part 1242b are connected movably. In the embodiment, the pivotal part 1242b has a limitation slot 1242c. The movable part 1242a includes a pin 1242d. The movable part 1242a is inserted into the pivotal part 1242b in a slidable way. The pin 1242d is confined to slide in the limitation slot 1242c. Therefore, by the limitation effect of the limitation slot 1242c to the pin 1242d, the movable part 1242a is also confined to slide relative to the pivotal part 1242b, so as to prevent the movable part 1242a from departing from the pivotal part 1242b.

It is added that, in practice, the limitation slot can be formed on the movable part 1242a while the pin is correspondingly disposed on the pivotal part 1242b. The pin is confined to relatively slide in the limitation slot, which also realizes the confined sliding engagement of the movable part 1242a with the pivotal part 1242b.

In addition, if required, the fixing of the movable part 1242a and the pivotal part 1242b can be performed by a positioning pin passing through holes formed on the movable part 1242a and the pivotal part 1242b correspondingly, but the invention is not limited thereto. Furthermore, in practice, the movable part 1242a thereon can form a plurality of positioning holes or positioning indentations. The pivotal part 1242b includes a positioning pin. Selectively inserting the positioning pin into one of the positioning holes or positioning indentations can reach the fixing purpose of the movable part 1242a with the pivotal part 1242b and also can confine the sliding range of the movable part 1242a relative to the pivotal part 1242b.

Figure 3:
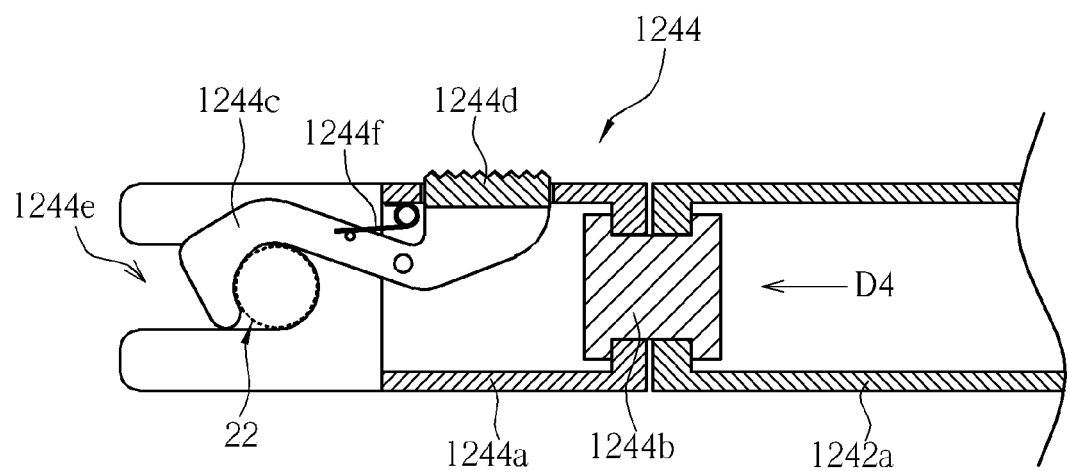
FIG. 3 is a sectional view of an engagement part and a part of a movable part in FIG. 1.

Please refer to FIG. 2 and FIG. 3. FIG. 3 is a sectional view of the engagement part 1244 and a part of the movable part 1242a. In the embodiment, the engagement part 1244 includes a body 1244a, a pivot 1244b, a hook 1244c, and a release button 1244d. The body 1244a of engagement part 1244 passes through the pivot 1244b to be pivotally connected to the movable part 1242a in a direction D4 (i.e. a reverse direction to the direction D1) perpendicular to the pivotal direction D3 (referring to FIG. 1). During the engagement of the engagement part 1244 with the anchor-holding structure 22, the fixing rod (shown by a dashed circle in FIG. 3) of the anchor-holding structure 22 enters the body 1244a from the opening 1244e and gets inside the hook 1244c by pushing the hook 1244c along the outer surface of the hook 1244c or by pressing the release button 1244d. Then, the hook 1244c is driven back to the original position by the resilience by a spring 1244f to hook the fixing rod. The engagement of the engagement part 1244 with the anchor-holding structure 22 by the hook 1244c is therefore completed. During the disengagement of the engagement part 1244 from the anchor-holding structure 22, a user can press the release button 1244d so that the hook 1244c is capable of being disengaging from anchor-holding structure 22 and then move the engagement part 1244 (usually the whole child safety seat 1) out.

Figure 4:
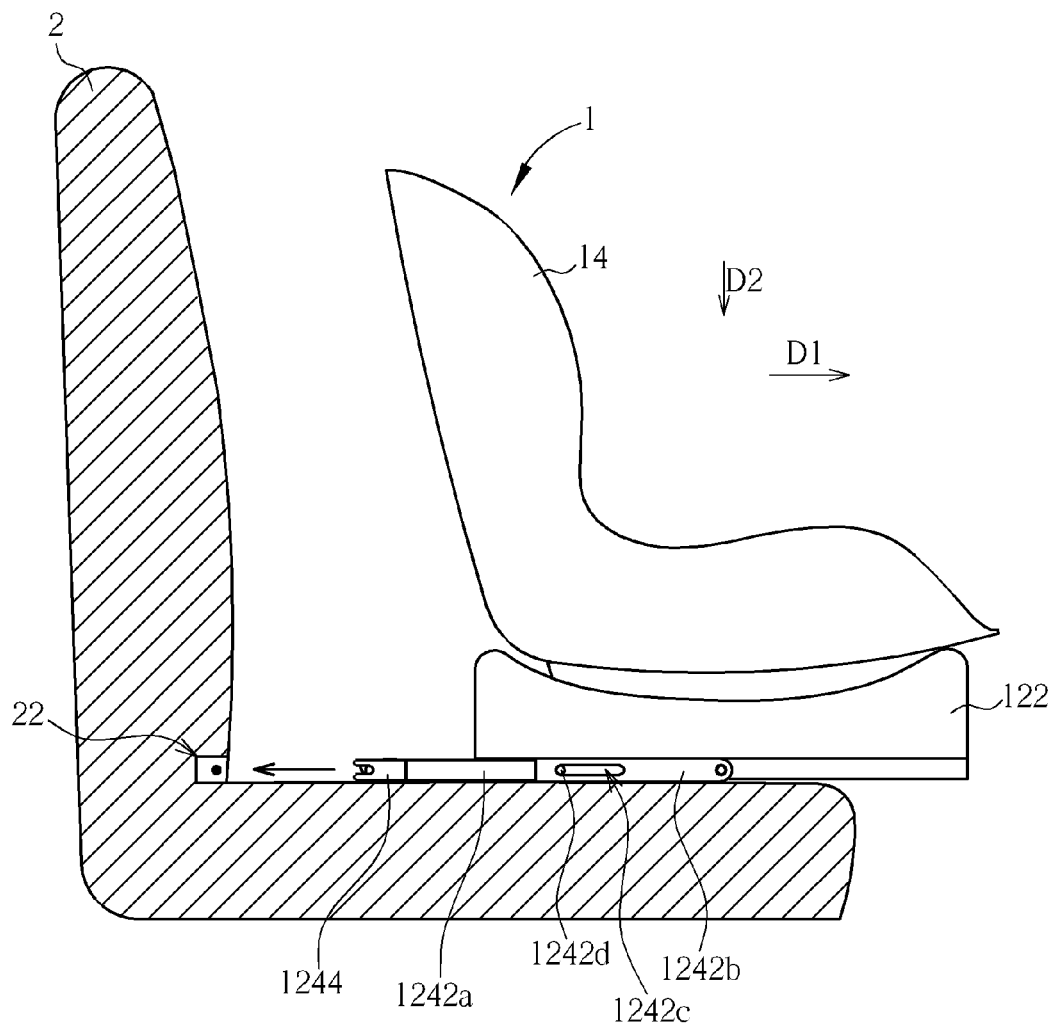
FIG. 4 is a side view of the child safety seat installed on the car seat in FIG. 1.

In the embodiment, the connecting device 124 has the feature of extensibility, so during the process of the child safety seat 1 being installed on or detached from the car seat 2, the connecting device 124 can be extended so as to facilitate the changing operation of the fixing direction of the child safety seat 1. Please refer to FIG. 2 and FIG. 4. FIG. 4 is a side view of the child safety seat 1 installed on the car seat 2. If a user wants the child safety seat 1 to be used in the forward-facing configuration, the user can rotate the connecting device 124 relative to the seat base 122 to the rear of the seat 14 and then move the movable part 1242a to extend the connection part 1242, so that the user can engage the engagement part 1244 with the anchor-holding structure 22, as shown in FIG. 4. After the engagement part 1244 is engaged with the anchor-holding structure 22, the user can push the seat base 122 together with the seat 14 toward the car seat 2 to retract the movable part 1242a into the pivotal part 1242b, as shown in FIG. 2. The installation of the child safety seat 1 used in the forward-facing configuration is therefore completed. It is added that in the embodiment, the anchor-holding structure 22 includes two anchorage points, so the connecting device 124 is disposed at each of the two sides of the seat base 122 so as to capable of being engaged with the two anchorage points correspondingly. The connecting devices 124 at the sides of the seat base 122 can be connected by a cross rod for the convenience of the user to operate the structures at the two sides at the same time, but the invention is not limited thereto.

Figure 5:
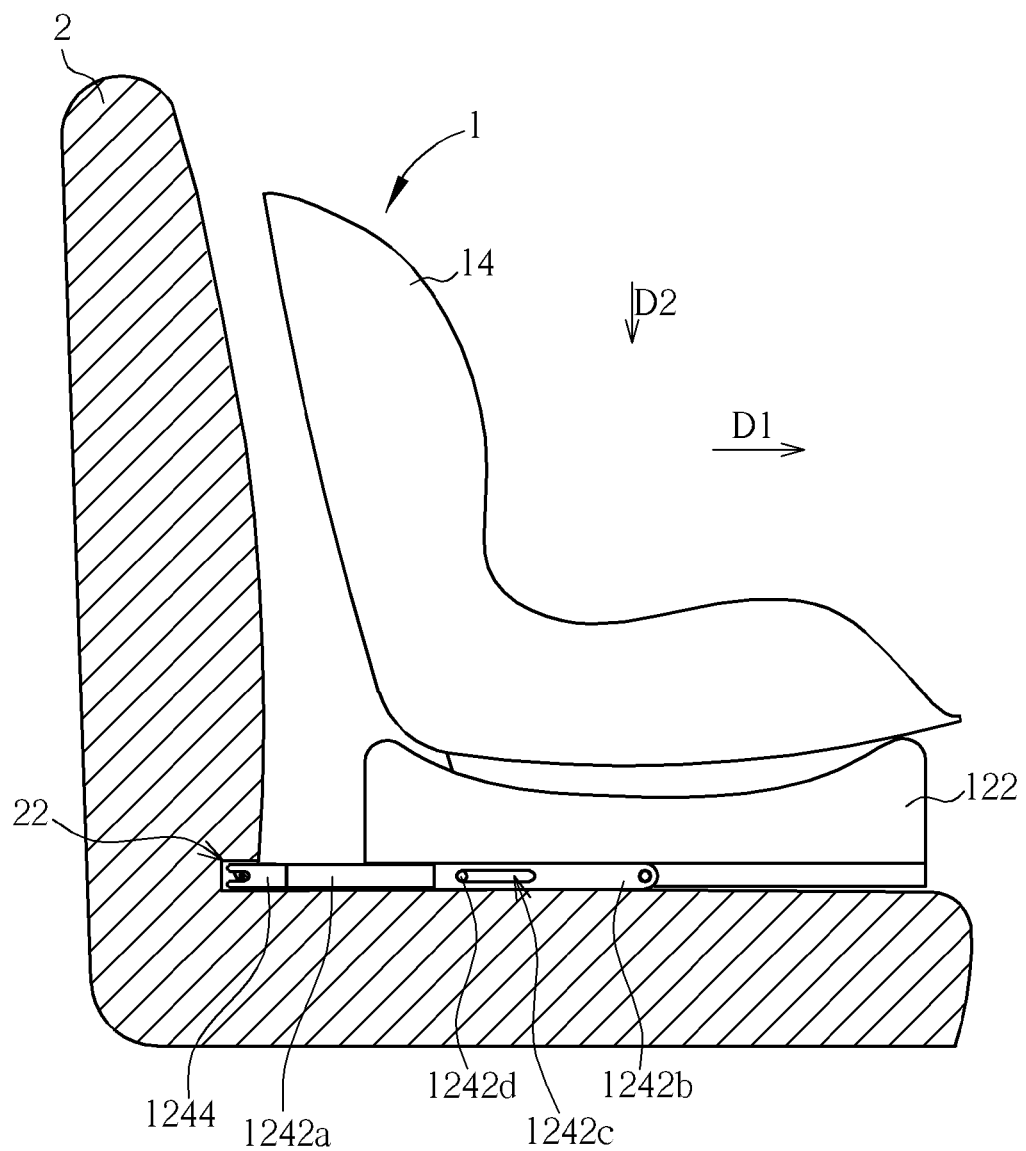
FIGS. 5 through 10 are diagrams illustrating serial operations of changing the child safety seat in FIG. 1 to be used in a rearward-facing configuration.
Figure 6:
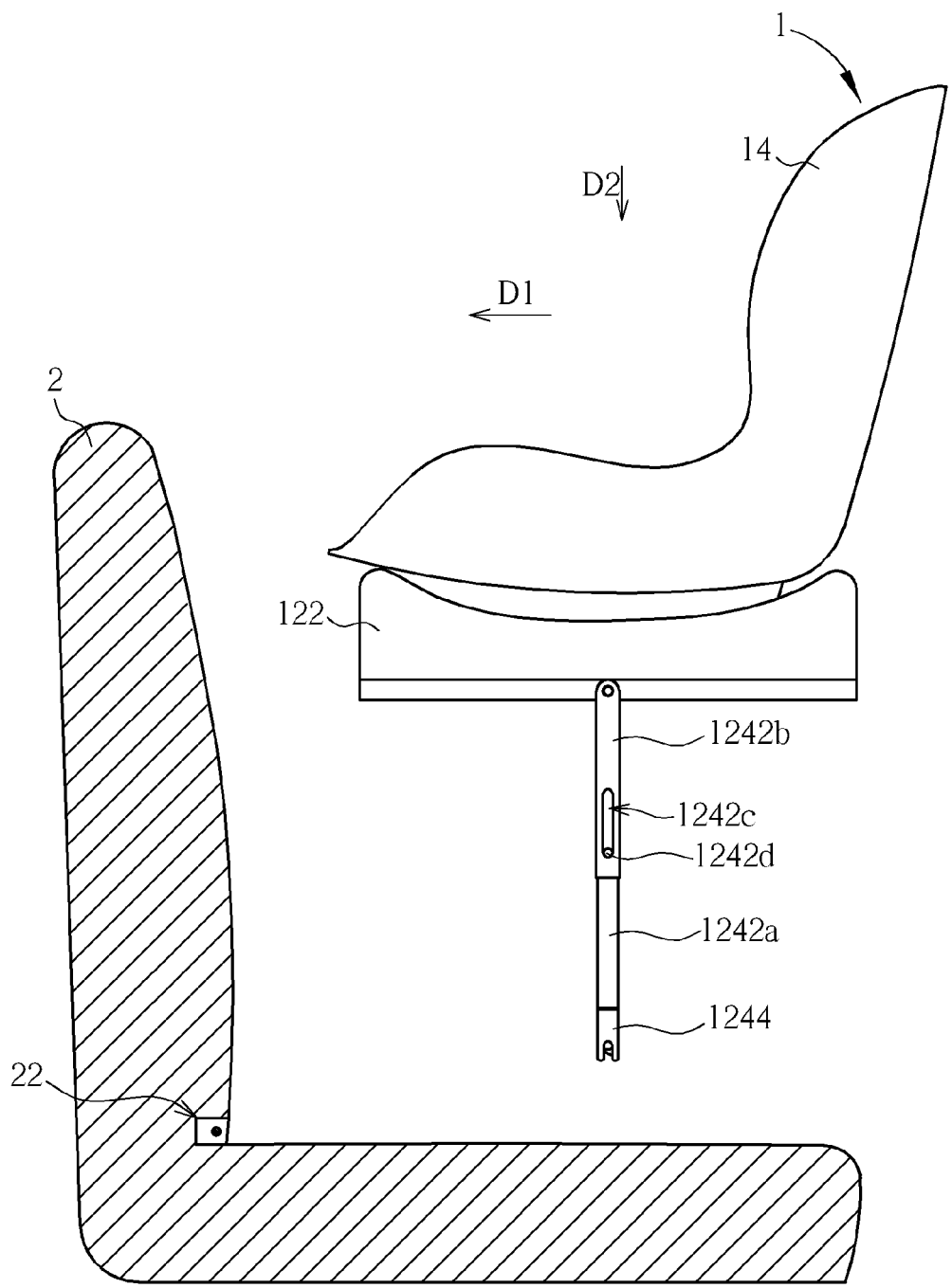
Figure 7:
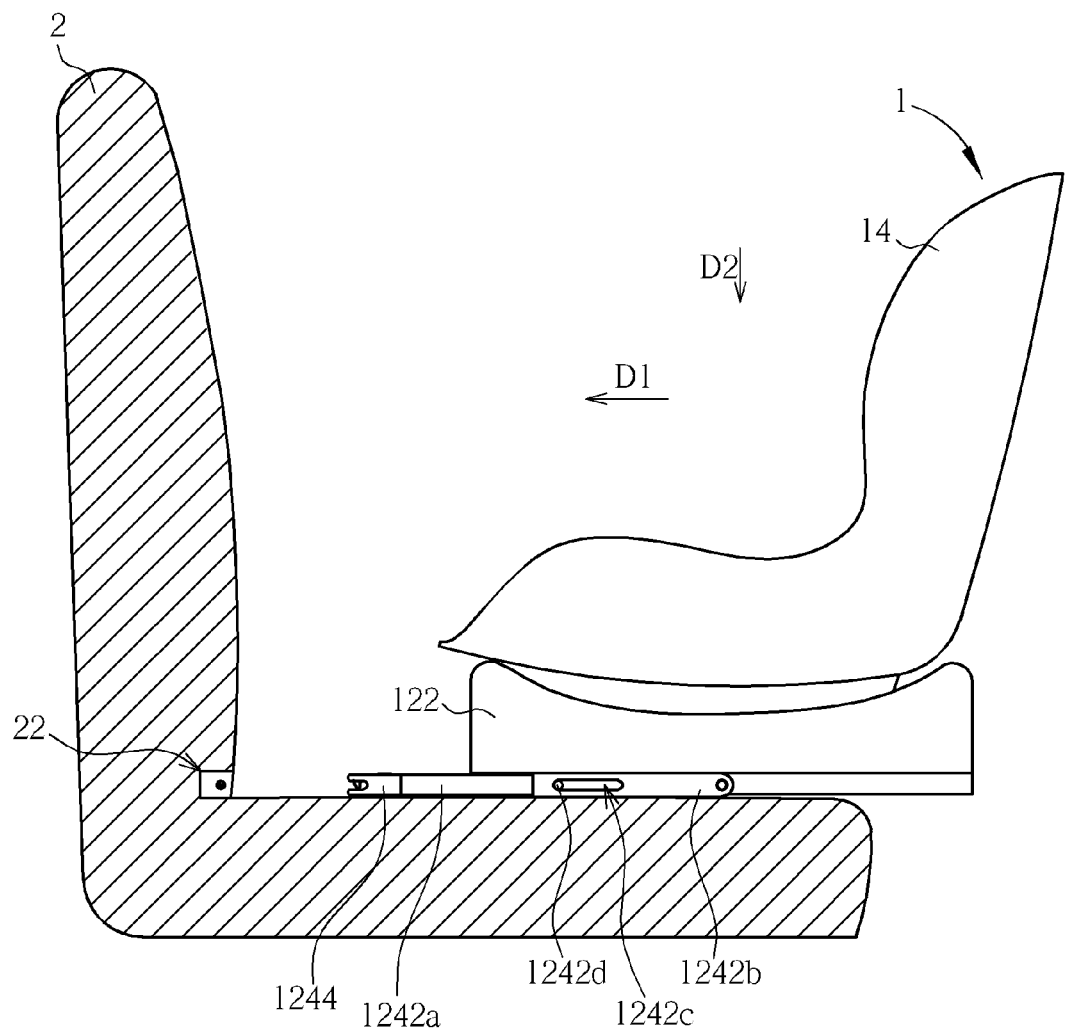
Figure 8:
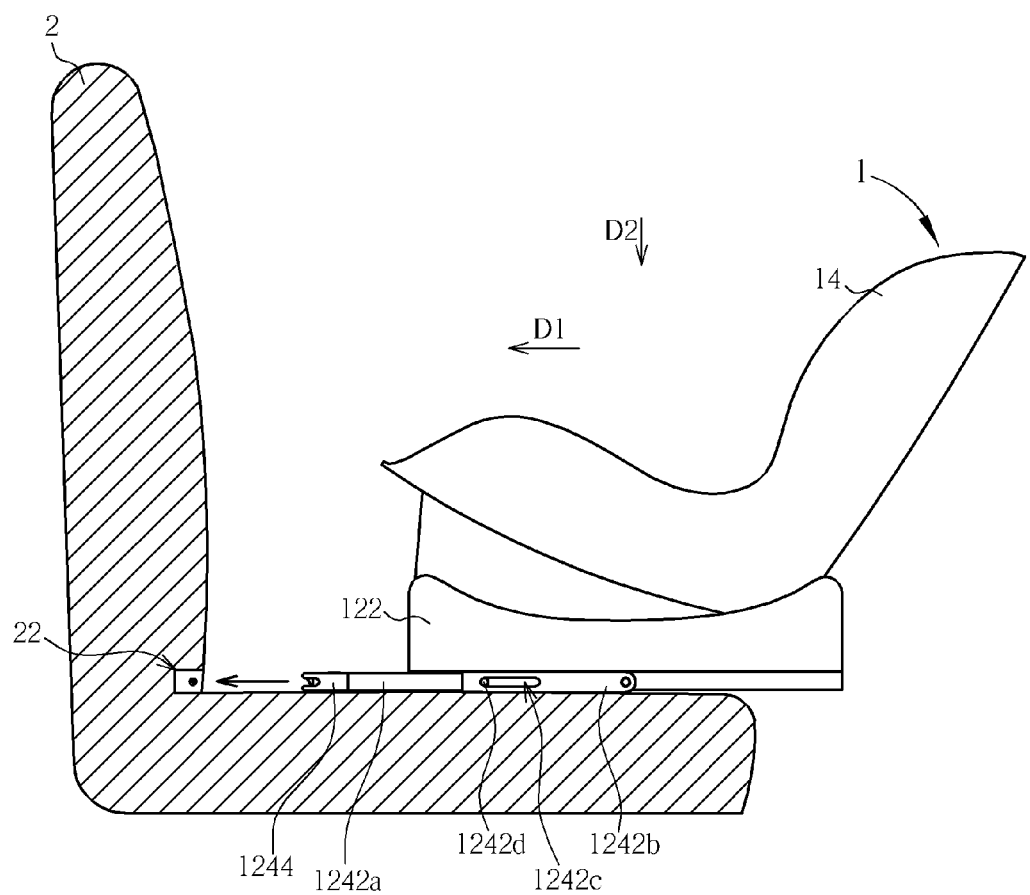

Please refer to FIGS. 5 through 10. FIGS. 5 through 10 are diagrams illustrating serial operations of changing the child safety seat 1 to be used in the rearward-facing configuration. If a user wants to change the child safety seat 1 to be used in a rearward-facing configuration, the user can pull the seat base 122 together with the seat 14 forward away from the car seat 2 so as to extend the connection part 1242, so that the user can disengage the engagement part 1244 from the anchor-holding structure 22, as shown in FIG. 5. After the disengagement, the user can lift the child safety seat 1. The connecting device 124 hangs down naturally. Then, the user turns the child safety seat 1 in 180 degrees, as shown in FIG. 6. Afterward, the user rotates the connecting device 124 relative to the seat base 122 to the front of the seat 14 and then puts the child safety seat 1 on the car seat 2 for following operation by the user, as shown in FIG. 7. The seat 14 in the rearward configuration is usually used for children in infant period, so the seat 14 needs to be tilted for an infant to lie on. In practice, the user can adjust the tilt angle of the seat 14 before the engagement part 1244 is engaged with the anchor-holding structure 22, as shown in FIG. 8. In practice, the user can perform the above tilt adjustment by use of a curved sliding mechanism, but the invention is not limited thereto.

Figure 9:
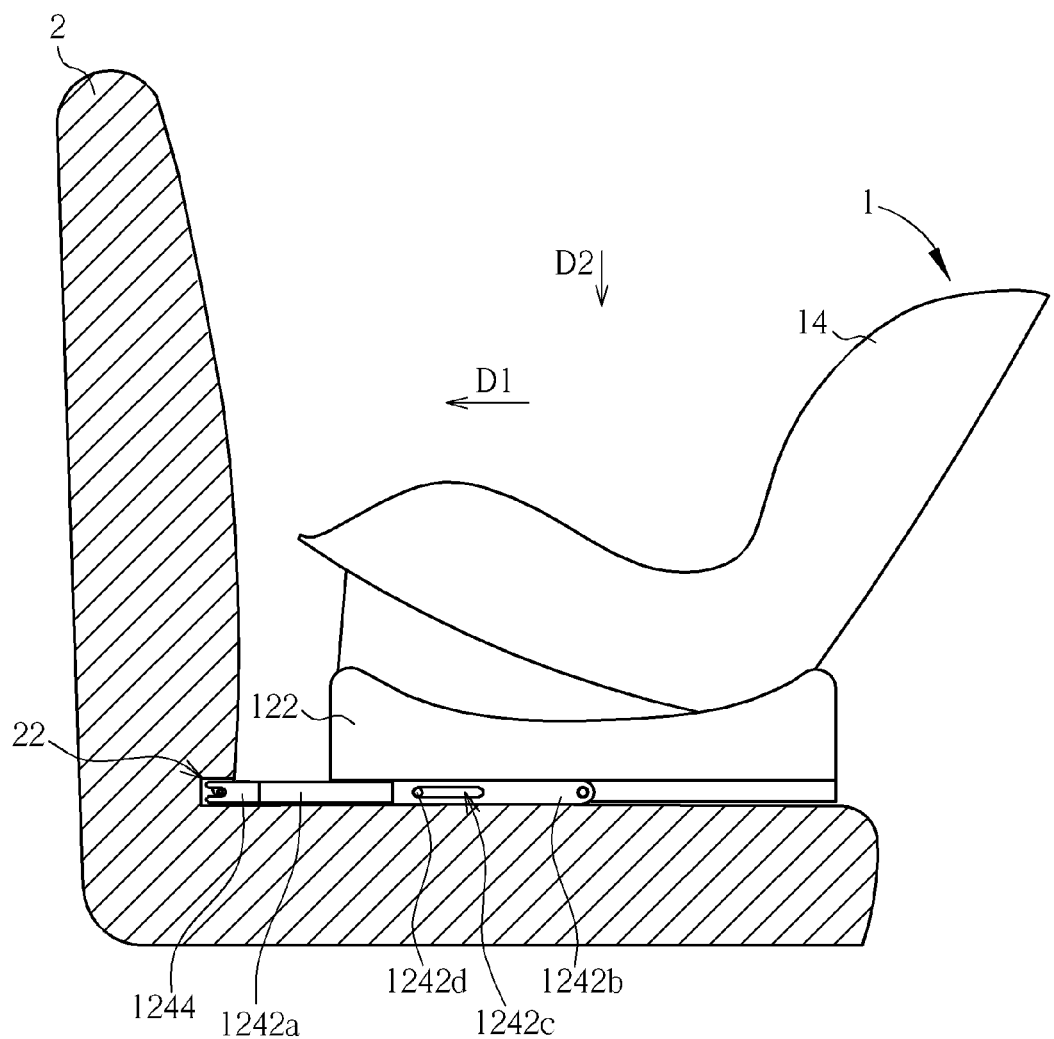
Figure 10:
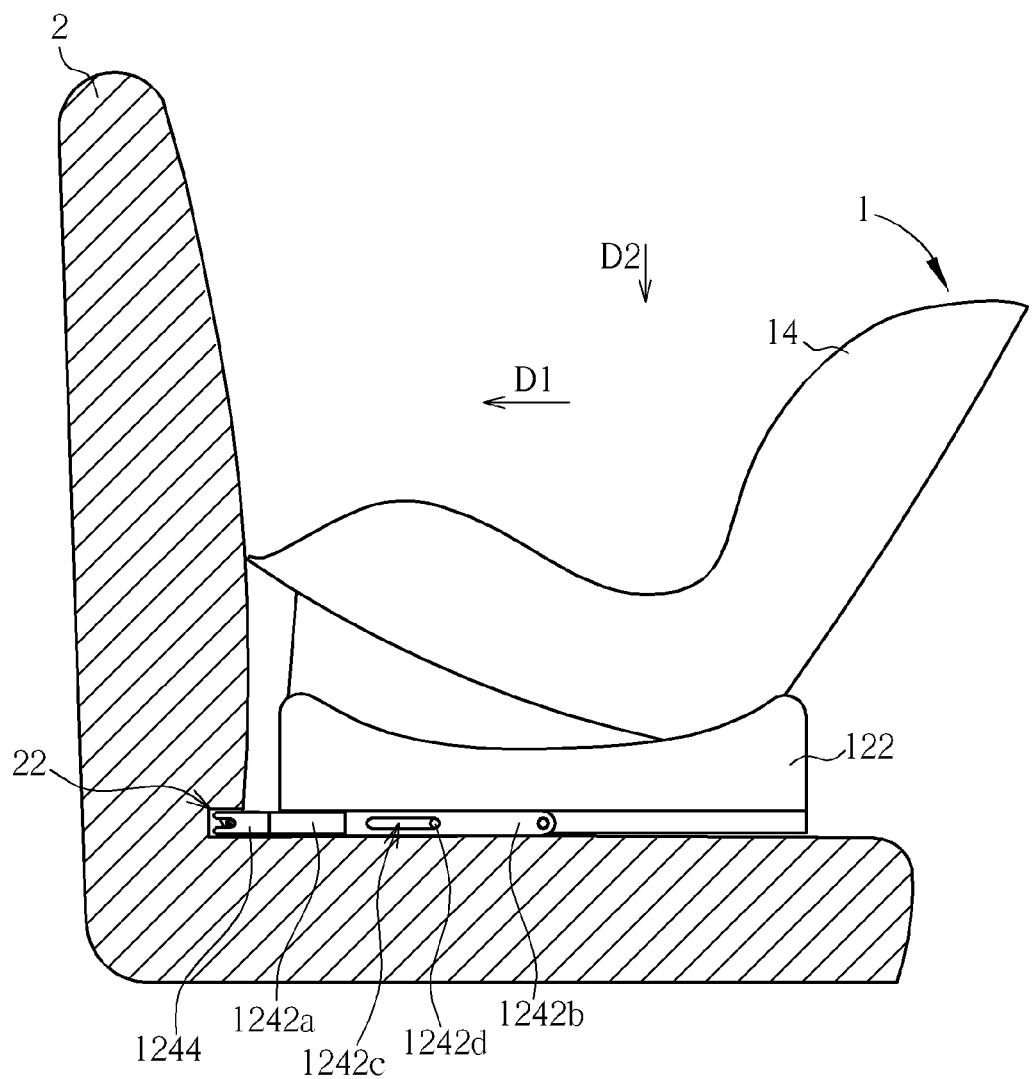

Afterward, the user can engage the engagement part 1244 with the anchor-holding structure 22, as shown in FIG. 9. It is added that the hook 1244c is capable of being engaged with the anchor-holding structure 22 only when the opening of the hook 1244c faces downward, so the opening of the hook 1244c needs to be kept facing downward during the changing of the child safety seat 1. Therefore, the user can rotate the engagement part 1244 around the direction D4 (in 180 degrees) to make the opening of the hook 1244c in FIG. 9 face downward before the engagement part 1244 is engaged with the anchor-holding structure 22. In practice, the above rotation operation can be performed in the status shown in FIG. 6. In such case, the release button 1244d also faces upward when the engagement part 1244 is put on the car seat 2, so that the release button 1244d can be pressed successfully next time a changing operation is performed on the child safety seat 1. After the engagement part 1244 is engaged with the anchor-holding structure 22, the user can push the seat base 122 together with the seat 14 toward the car seat 2 so as to retract the movable part 1242a back to the connection part 1242; the installation of the child safety seat 1 used in the rearward-facing configuration is therefore completed, as shown in FIG. 10.

Figure 11:
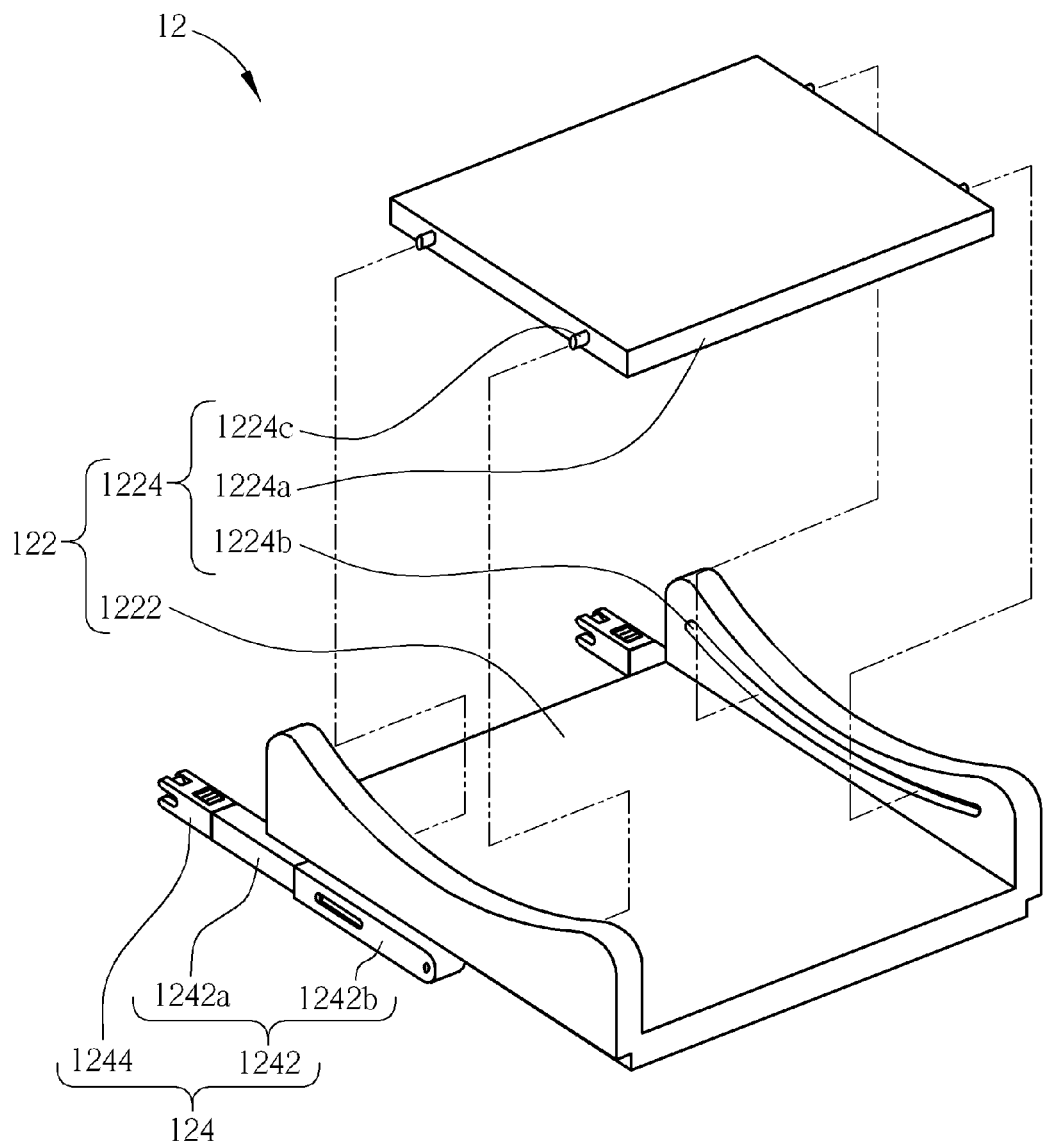
FIG. 11 is a partially-exploded view of an adjustable anchorage mechanism of the child safety seat in FIG. 1.

Please refer to FIG. 11. FIG. 11 is a partially-exploded view of the adjustable anchorage mechanism 12. It is added that in the embodiment, the seat base 122 includes a body 1222, and a sliding mechanism 1224 disposed on the body 1222. The sliding mechanism 1224 includes a sliding plate 1224a and two slots 1224b formed on the body 1222. The sliding plate 1224a is used for being joined with the seat 14. The detailed structure of the joining depends on an actual product specification and will not be described in detail herein. In FIG. 11, the sliding plate 1224a is shown only by a plate. The sliding plate 1224a uses guiding bosses 1224c disposed at two sides thereof to slide in the slots 1224b, so that the sliding plate 1224a is capable of being tilted relative to the body 1222; that is, the disposition inclination angle of the seat 14 jointed onto the sliding plate 1224a can be adjusted by the sliding mechanism 1224. Therein, the fixing on the tilt angle of the seat 14, i.e. the fixing on the sliding plate 1224a can be performed by use of a positioning pin in coordination with a plurality of positioning holes, a ratchet mechanism, and a pressing mechanism by friction force, which is not described in detail herein.

As discussed above, the adjustable anchorage mechanism of the invention utilizes a rotatable connecting device to provide two engagement directions with the anchor-holding structure, so that the child safety seat of the invention can be used in forward-facing configuration or in rearward-facing configuration by request, which realizes the design of safety seat capable of being used in forward-facing configuration or in rearward-facing configuration. Therefore, it is unnecessary for parents to buy two child safety seats for different age ranges so as to save money. Furthermore, the connecting device of the adjustable anchorage mechanism is rotatable downward relative to the seat base, so in principle, changing engagement direction of the adjustable anchorage mechanism with the anchor-holding structure needs only vertical operation space, and objects adjacent to the safety seat will not obstruct the operation. It facilitates user's operation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An adjustable anchorage mechanism used in a child safety seat, the adjustable anchorage mechanism comprising:
   a seat base thereon defining a seat direction and a sitting direction, the seat base being joined with a seat such that the seat faces toward the seat direction, a child being capable of sitting on the seat in the sitting direction; and
   a connecting device pivotally connected to the seat base and capable of being engaged with an anchor-holding structure of a car seat, the connecting device comprising a connection part and an engagement part, the connection part comprising a movable part and a pivotal part, the movable part and the pivotal part being connected movably, the connection part being pivotally connected to the seat base in a pivotal direction by the pivotal part, the pivotal direction being perpendicular to the seat direction and the sitting direction, the engagement part being pivotally connected to the movable part and comprising a hook and a pivot, the engagement part engaging with the anchor-holding structure with the hook, and the engagement part is pivotally connected to the movable part by the pivot so the engagement part rotates about an axis formed in a longitudinal direction of the movable part and the engagement part that is perpendicular to the pivotal direction.

2. The adjustable anchorage mechanism of claim 1, wherein
   the pivotal part has a limitation slot, the movable part comprises a pin, and the pin is confined to slide in the limitation slot.

3. The adjustable anchorage mechanism of claim 1, wherein the seat base comprises a curved sliding mechanism, and the seat is engaged with the curved sliding mechanism so that a disposition inclination angle of the seat is capable of being adjusted.

4. A child safety seat, comprising:
   a seat base thereon defining a seat direction and a sitting direction;
   a seat joined with the seat base such that the seat faces toward the seat direction, a child being capable of sitting on the seat in the sitting direction; and
   a connecting device pivotally connected to the seat base and capable of being engaged with an anchor-holding structure of a car seat, the connecting device comprising a connection part and an engagement part, the engagement part comprising a hook and a pivot, the connection part comprising a movable part and a pivotal part, the movable part and the pivotal part being connected movably, the movable part and the engagement part being pivotally connected, the connection part being pivotally connected to the seat base in a pivotal direction by the pivotal part, the pivotal direction being perpendicular to the seat direction and the sitting direction, the engagement part engaging with the anchor-holding structure with the hook selectively in front or rear of the seat, and the engagement part is pivotally connected to the movable part by the pivot so the engagement part rotates about an axis formed in a longitudinal direction of the movable part and the engagement part that is perpendicular to the pivotal direction.

5. The child safety seat of claim 4, wherein the pivotal part has a limitation slot, the movable part comprises a pin, and the pin is confined to slide in the limitation slot.

6. The child safety seat of claim 4, wherein the seat base comprises a curved sliding mechanism, and the seat is engaged with the curved sliding mechanism so that a disposition inclination angle of the seat is capable of being adjusted.

7. The child safety seat of claim 4, wherein the connecting device is pivotally connected to a bottom of the seat base.

* * * * *